United States Patent [19]

Stolzer

[11] 4,359,921
[45] Nov. 23, 1982

[54] DOUBLE-ACTING CYLINDER-PISTON UNIT FOR A MECHANICAL FRAME SAW

[75] Inventor: Paul Stolzer, Achern, Fed. Rep. of Germany

[73] Assignee: KEURO Maschinenbau GmbH & Co. KG, Achern-Gamshurst, Fed. Rep. of Germany

[21] Appl. No.: 245,031

[22] Filed: Mar. 18, 1981

[30] Foreign Application Priority Data

May 9, 1980 [DE] Fed. Rep. of Germany ... 8012655[U]

[51] Int. Cl.³ .................... B23D 49/04; B23D 51/20
[52] U.S. Cl. ........................................ 83/756; 83/759
[58] Field of Search ................ 83/756, 757, 759, 796, 83/647

[56] References Cited

U.S. PATENT DOCUMENTS

| | | | |
|---|---|---|---|
| 3,288,008 | 11/1966 | Stolzer | 83/647 X |
| 3,575,074 | 4/1971 | Aizawa | 83/796 |
| 3,760,678 | 9/1973 | Stolzer | 83/647 X |
| 4,015,500 | 4/1977 | Stolzer | 83/756 X |

*Primary Examiner*—Frank T. Yost
*Attorney, Agent, or Firm*—Spencer & Kaye

[57] ABSTRACT

A double-acting cylinder piston unit for controlling the feed motion of a saw blade relative to a workpiece in a mechanical frame saw having a stationary machine frame, a housing part pivotally mounted on the machine frame and a saw frame guide movably mounted in the housing part and carrying a saw blade. The piston of the cylinder piston unit is pivotally connected to the machine frame, while the cylinder thereof is pivotally connected to the pivotally mounted housing part. The cylinder includes a cylinder head in the form of a block, and the unit includes a reservoir delimited by one face of the block, a first wall extending from, and substantially perpendicular to, the one face and a second wall spaced from, and substantially parallel to, the face. The block is provided with two bores each defining a portion of a flow path between a respective cylinder chamber and the reservoir; each bore communicates with its associated valve and forms the seat for a throttle valve communicating with its associated chamber. A flow path between the reservoir and one cylinder chamber includes a tube extending within the cylinder and along the axis thereof from that bore in the block which forms a part of the same flow path. The piston is provided with an axially extending bore communicating with the one cylinder chamber and into which said tube extends, and the piston bore is sealed in a manner to permit relative movement, in the axial direction of the cylinder, between the tube and the piston.

3 Claims, 4 Drawing Figures

DOUBLE-ACTING CYLINDER-PISTON UNIT FOR A MECHANICAL FRAME SAW

BACKGROUND OF THE INVENTION

The present invention relates to a double-acting cylinder-piston unit for generating the feed motion of a saw blade in the direction into a workpiece and for generating the cutting pressure in a mechanical frame saw whose saw blade is clamped in obliquely of a saw frame guide.

Such a cylinder-piston unit is connected pivotably on the one hand with the machine frame and on the other with the housing part which contains the saw frame guide and the saw frame drive and which is pivotably mounted on the machine frame. Furthermore, a first cylinder chamber of the unit, loaded by the hydraulic medium generating the cutting pressure, is connected with a reservoir for the hydraulic pressure medium through an adjustable cutting pressure valve in the form of a spring-loaded throttle valve which opens when the set cutting pressure is exceeded, and through a non-return valve which closes when the cutting pressure is reached in the first chamber. The second cylinder chamber of the unit, loaded by the weight of the articulated housing part, is in communication with the reservoir through an adjustable throttle valve and a suction valve in the form of a non-return valve.

Such cylinder-piston units are used in mechanical frame saws such as are disclosed for example in German Pat. Nos. 1,502,987 and 2,525,154. In these machines, the housing part containing the saw frame guide and the saw frame drive is mounted pivotably, with its rear end in relation to the saw blade, on the machine frame and supported ahead of this mounting, in the direction toward the saw blade, against the cylinder-piston unit, the latter being primarily articulated with the piston rod to the pivotable housing part, while it is connected, via its cylinder, with the fixed machine frame.

A cylinder-piston unit of the initially mentioned kind is disclosed especially in German Pat. No. 2,525,154. Here the cylinder jacket is surrounded by the oil reservoir and the feed motion valve, and the two non-return valves are arranged one behind the other axially in the hollow-bored piston rod, with the piston and the cylinder wall adjoining the latter at the end. The cutting pressure valve is arranged on the other side of the cylinder, in the cylinder head which is located there, from where pressure medium can flow back into the oil reservoir on the jacket.

This above-outlined known structure is distinguished by compactness. However, it necessitates a relatively expensive type of construction with many individual parts, which correspondingly influences the costs for constructing the known cylinder-piston unit. This relates specifically also to the circumstance that in the known case the piston rod which functions as a bearing or loaded component must be bore out and correspondingly dimensioned.

SUMMARY OF THE INVENTION

It is an object of the present invention to reduce the number of component parts and manufacturing costs of a cylinder-piston unit of the above-described type.

A further object of the invention is to reduce the space requirements of such a piston-cylinder unit.

Another object is to utilize such a less expensive piston-cylinder unit to correspondingly reduce the costs for the entire mechanical frame saw, which has a particularly marked effect in smaller machines.

These and other objects are achieved, according to the invention, in a double-acting cylinder piston unit for controlling the feed motion of a saw blade relative to a workpiece in a mechanical frame saw having a stationary machine frame, a housing part pivotally mounted on the machine frame and a saw frame guide movably mounted in the housing part and carrying a saw blade, the cylinder-piston unit being pivotally connected between the machine frame and housing part and including a cylinder, a piston displaceably mounted in the cylinder and dividing the interior of the cylinder into first and second cylinder chambers, a reservoir containing a hydraulic pressure medium, means defining a hydraulic medium flow path between the reservoir and each cylinder chamber such that hydraulic medium pressure in the first chamber produces a force urging the saw blade toward the workpiece, a respective non-return valve disposed between the reservoir and each flow path for permitting fluid flow from the reservoir into each cylinder chamber, a spring-loaded throttle valve including a valve member and a valve seat disposed in the flow path between the reservoir and the first cylinder chamber for permitting hydraulic medium to flow from the first cylinder chamber when the fluid pressure exceeds a predetermined value, and an adjustable throttle valve disposed in the flow path between the reservoir and the second cylinder chamber for permitting a controlled fluid flow therebetween, by constructing the cylinder piston unit so that: the piston is pivotally connected to the machine frame; the cylinder is pivotally connected to the pivotally mounted housing part; the cylinder includes a cylinder head in the form of a block; the reservoir is delimited by one face of that block, a first wall extending from, and substantially perpendicular to, the one face and a second wall spaced from, and substantially parallel to, that face; the block is provided with two bores each defining a portion of the flow path between a respective cylinder chamber and the reservoir; each bore communicates with its associated valve and forms the seat for the throttle valve communicating with its associated chamber; each throttle valve member is mounted in the second wall in a manner to be adjustable relative to its associated seat; the means establishing a flow path between the reservoir and the first cylinder chamber include a tube extending within the cylinder, along the axis thereof from that bore in the block which forms a part of the same flow path; and the piston is provided with an axially extending bore communicating with the first cylinder chamber, into which the tube extends, and sealing means sealing the piston bore while permitting relative movement, in the axial direction of the cylinder, between the tube and the piston.

One significant feature of the invention is that the hydraulic connections are united as bores in one component, that is to say they require no separate conduits, with the exception of the connection to the first cylinder chamber, which can be provided by a simple tube subject to no particular physical demands. The fabrication of the piston is also simplified, since the piston needs to be provided only with a central bore for the tube and transverse bores, communicating with the first cylinder chamber at the level of the latter, for the passage of oil.

On the other hand the block at the reservoir side at the same time forms the mounting for the non-return valves and the seats for the throttle valves, so that no separate components are necessary for these purposes, while furthermore the closure wall and interior volume of the reservoir at the same time serve to accommodate the valves.

Due to the fact that the cylinder-piston unit is attached via its piston rod to the machine frame and via its cylinder to the pivotably mounted housing part, the advantage is also obtained that dirt falling from above practically cannot reach the sliding connection between cylinder closure lid and piston rod, so that damage due to wear is there prevented.

As a whole the measures according to the invention result in a considerably simplified and smaller structure which signifies a correspondingly considerable reduction of the manufacturing costs for a mechanical frame saw.

In the form of construction of mechanical frame saws as disclosed basically in a German Pat. No. 1,502,987 it is expedient that the pivotable housing part with the crank shaft of the saw frame drive is rotatably mounted in the block, whereby a size reduction and a structural simplification are achieved also as regards the articulation to the pivotable housing part. In this case it can be advantageous that the mounting is provided by means of an eccentric carried by the crank shaft for lifting the saw blade away at the end of its cutting stroke and reapplying the blade at the end of its return stroke, as is known per se.

DESCRIPTION OF THE PREFERRED EMBODIMENT

Figure 1:
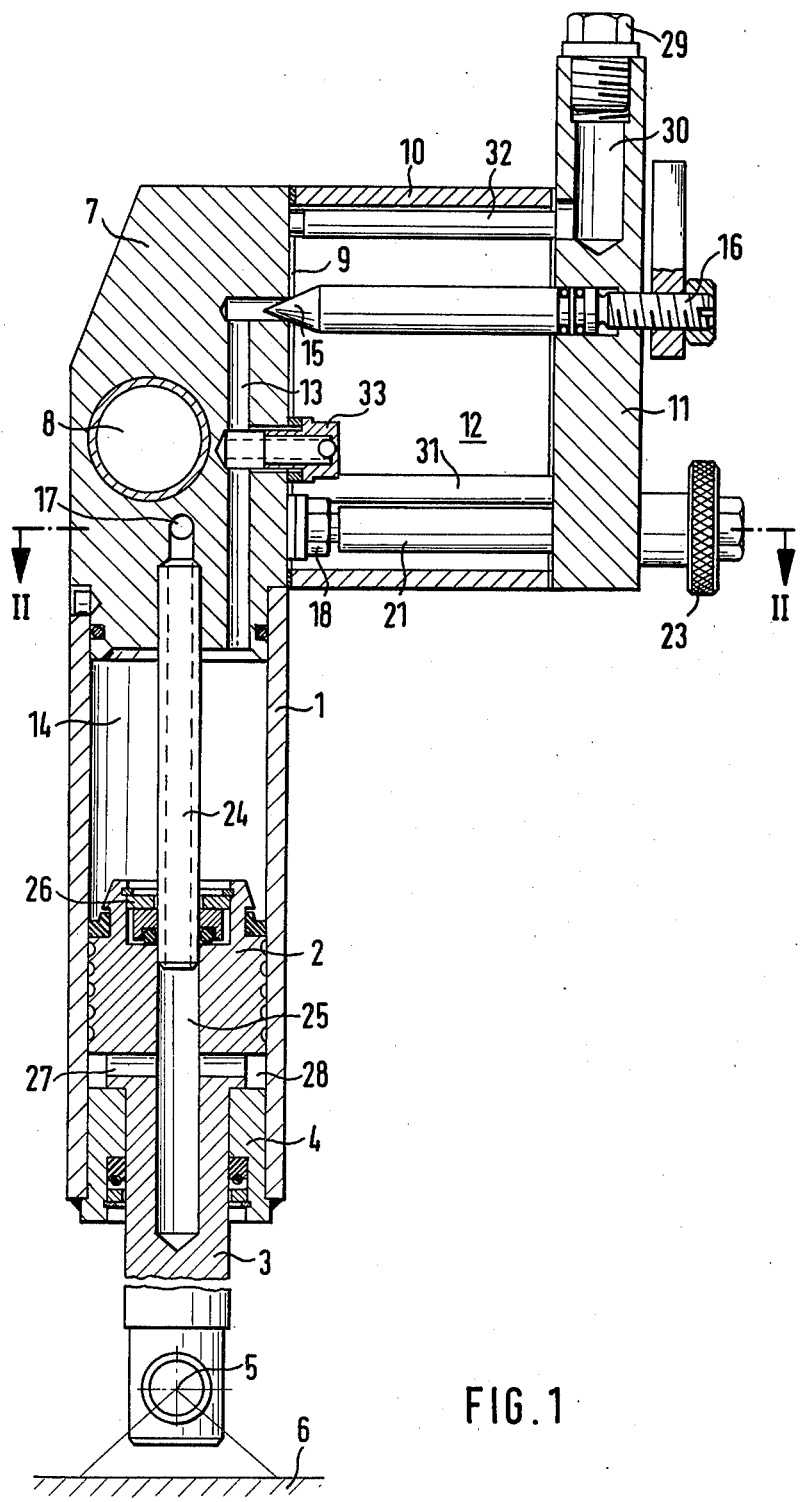
FIG. 1 is a cross-sectional elevational view of a cylinder-piston unit and reservoir according to a preferred embodiment of the invention.
Figure 2:
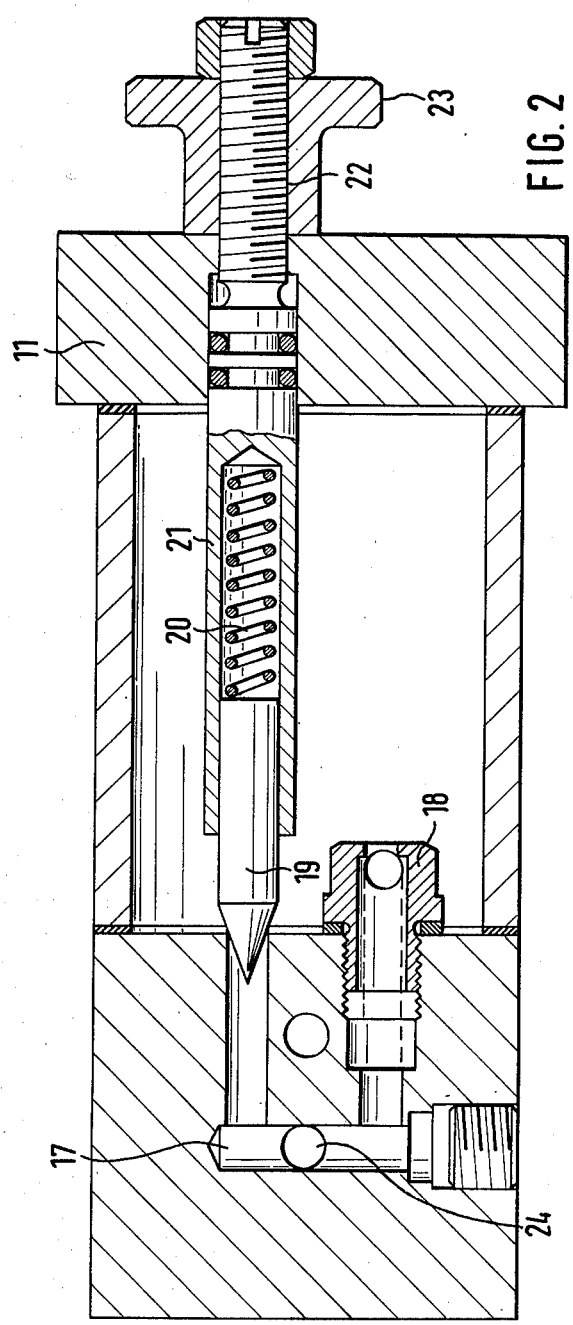
FIG. 2 is a cross-sectional view taken along the section line II—II of FIG. 1.
Figure 3:
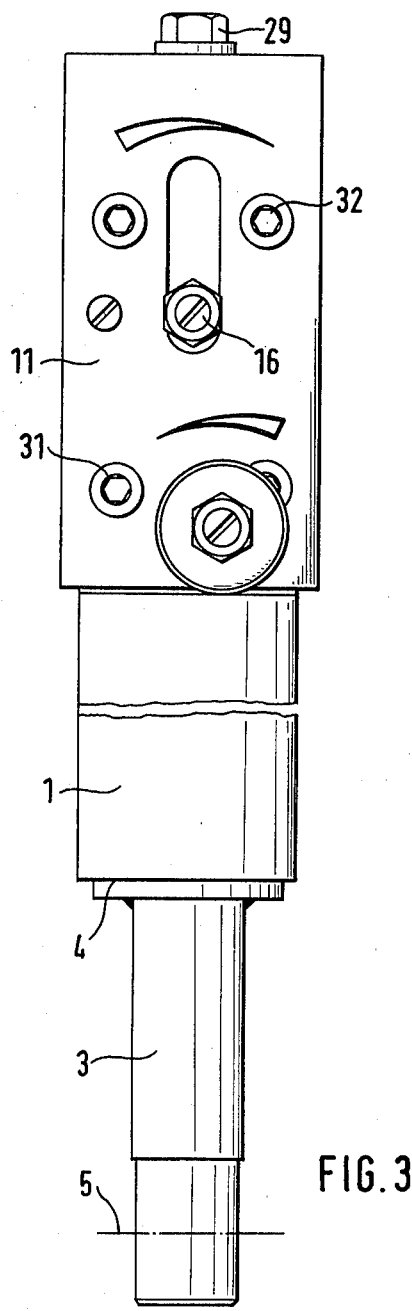
FIG. 3 is an elevational view of the cylinder-piston unit of FIG. 1, looking from the right side of FIG. 1.

The cylinder-piston unit shown in FIGS. 1–3 includes a cylinder 1 and a piston 2 mounted on a piston rod 3. The cylinder 1 is provided at one end with a closure lid 4 slidable on rod 3. The piston is pivotably articulated via the end of its piston rod 3 at pivot axis 5 to the machine frame 6. Piston 2 divides cylinder 1 into two chambers 28 and 14.

The other end of the cylinder 1 is closed by a block 7 having a bore 8 in which the crank shaft of a mechanical frame saw is rotatably mounted.

A wall 10 extends from, and is perpendicular to, one outer face 9 of the block 7. The other end of wall 10 is closed by a closure wall 11 parallel to face 9. Elements 9, 10 and 11 enclose, and delimit a reservoir 12 for the hydraulic pressure medium for the unit.

As shown in FIG. 1, block 7 carries a vertical bore 13 leading from the reservoir 12 to the second cylinder chamber 14 of a cylinder-piston unit. Communicating with the bore 13 is a non-return valve 33 and a throttle valve with a setting needle 15 which is adjustable in the closure wall 11 by means of a threaded connection 16. Needle 15 determines the flow cross-section of bore 13 at face 9.

The block 7 also has a horizontal transverse bore 17, shown in FIGS. 1 and 2, which communicates a further non-return valve 18 and a throttle valve having a needle 19 extending into one end of bore 17. The valve needle, or body, 19 is loaded by a spring 20 the initial force of which is adjustable by movement of a sleeve 21 which is displaceable in the closure wall 11 by means of a threaded connection 22 and a hand knob 23.

From the bore 17 a branch descends by way of a tube 24 which dips into a coaxial bore 25 of the piston 2 and is there guided in a liquid-tight manner by gaskets or packings 26. The bore 25 in the piston 2 is connected through transverse bores 27 of the piston 2 to the first cylinder chamber 28, which is closed up to its minimum volume in the position illustrated in FIG. 1.

As shown in FIG. 1 in combination with FIG. 3, a filler pipe 30 closable by a screw cap 29 is provided for the reservoir 12. Screws or bolts 31 and 32 serve for securing the reservoir on the block 7.

The manner of operation of the cylinder-piston unit as described is as follows:

Firstly it should fundamentally be pointed out that when, during the idle stroke, the saw blade moves away from the workpiece by the oblique orientation of the saw blade or additionally by mounting of the crank shaft through a corresponding eccentric in the bore 8, the weight of the pivotable housing part, including the parts contained in it, is supported by the block 7, and thus by the cylinder 1 so that the cylinder 1 tends to descend with reference to the view of FIG. 1, under this weight. However during the working stroke, the cutting force caused by the oblique placement of the saw blade has the consequence that the pivotable housing part and the parts contained in it seek to pivot or be deflected upward. Thus the cylinder 1 is also loaded so that, again with reference to FIG. 1, it seeks to move upward.

If now, during the working stroke, the cutting force has a value which does not reach the cutting force to which the valve 19–23 is set, this valve remains closed during the working stroke of the saw blade. This has the consequence that the cylinder 1 cannot move upwards under the influence of the cutting force action, which means that the saw blade penetrates into the workpiece with the maximum feed motion given by its oblique positioning.

If however the cutting force occurring on the saw blade is greater than that set on the cutting pressure valve 19–23, then the valve opens somewhat and the cylinder 1 rises, with reference to the view of FIG. 1, whereby a part of the pressure fluid contained in the cylinder chamber 28 is forced via bore 17 into the pressure fluid reservoir 12. With this movement pressure fluid is simultaneously sucked into the upper cylinder chamber 14 through the bore 13 and the non-return valve 33.

During the idle stroke of the saw blade, as stated, the weight of the pivotable housing part and the parts contained in it bears, via the block 7, upon the cylinder 1. Thus a quantity of pressure fluid, corresponding to the setting of the needle 15, flows through the conduit 13 from the cylinder chamber 14 into the reservoir 12, which ultimately signifies that the cylinder 1, during the idle stroke of the saw blade, descends, by a distance which is adjustable by setting the valve needle 15, relative to the piston 2, while the cylinder chamber 28 can draw in pressure fluid from the reservoir 12 through the non-return valve 18 and the conduit 17, 24, 25 and 27.

This acts on the saw blade during its idle stroke as feed motion in the direction towards the workpiece, for in this way at the beginning of its working stroke the saw blade places itself upon the workpiece at a lower point than at the beginning of the preceding working stroke.

If the saw were to work with a constant speed at all times, the feed valve 15, 16 could receive a fixed adjustment which would cause the saw blade during each idle stroke to experience the maximum feed motion in the direction towards the workpiece corresponding to its oblique position. Since however, as usual, the drive speed for the mechanical frame saw is adjustable in a plurality of stages, the needle valve 15, 16 must also be adjustable in the described manner, since the idle strokes of the saw blade require different lengths of time, and thus, correspondingly, there are different lengths of time during which the cylinder 1 can descend.

Figure 4:
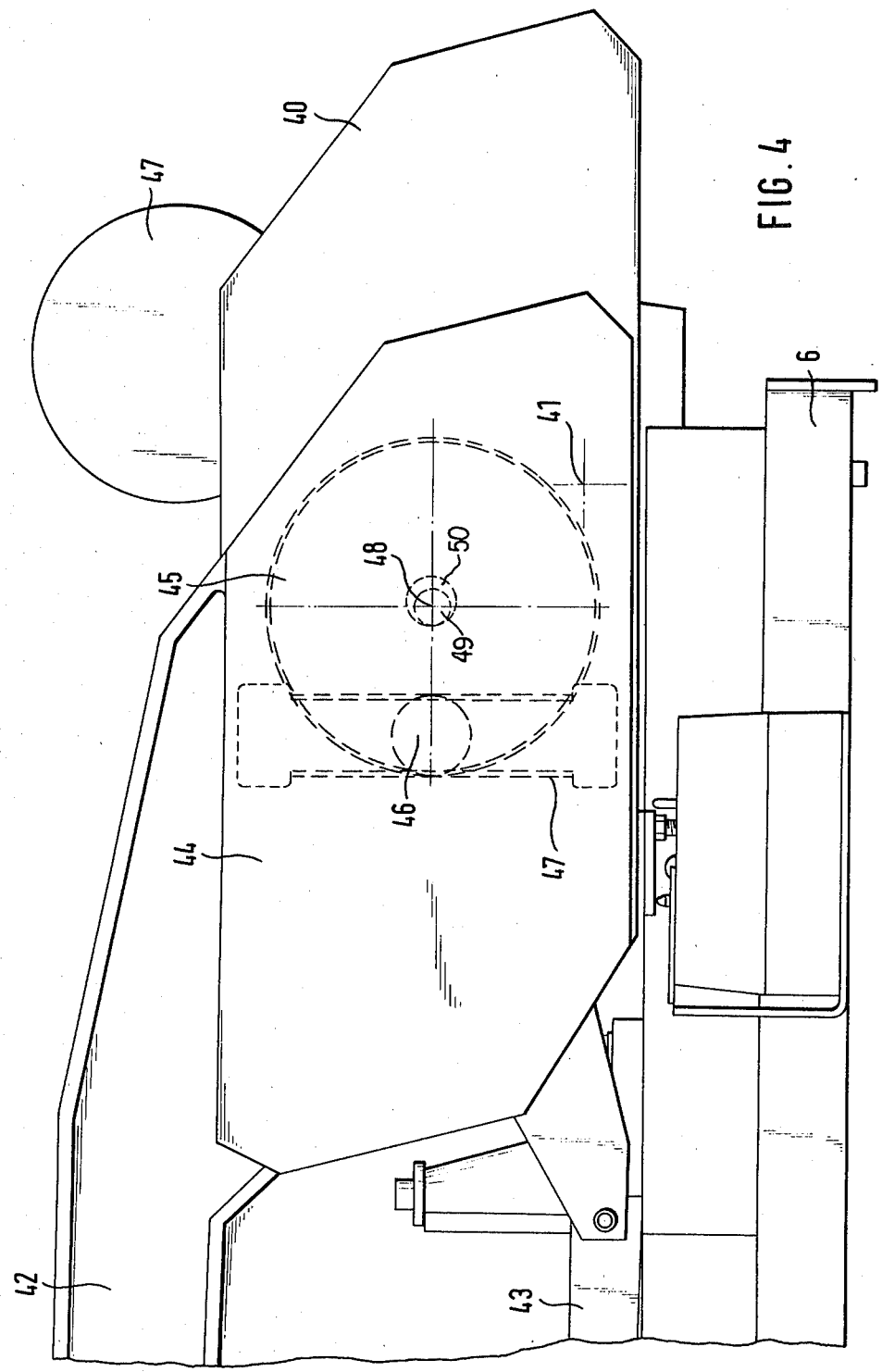
FIG. 4 is an elevational view of a portion of a mechanical frame saw in the region of the saw frame guide.

FIG. 4 shows part of a mechanical frame saw in order to clarify the operation of the cylinder-piston unit, which is not shown in FIG. 4.

FIG. 4 shows part of a machine frame 6 on which the pivotable housing part with a guide plate 40 for the saw frame 42, is articulated in order to pivot about the axis 41. The saw frame 42 with saw blade 43 is displaceably guided in translation on the guide plate 40 and the saw frame 42 contains the individual guide elements (not shown) within its rear part closed off by a housing lid 44. The drive for the reciprocating movement of the saw frame 42 is effected by a crank wheel 45 which carries a crank pin 46 that engages in a vertical slideway guide 47 on the rear part of the saw frame 42. The drive for the crank wheel 45 comes from a drive motor 47 through a shaft and a pinion (not shown) carried by the latter, the axis of which pinion coincides with the pivot axis 41 and practically simultaneously forms the pivot mounting.

The shaft of the crank wheel 45, which rotates about the axis 48, is rotatably mounted in the bore 8 of the block 7 of FIG. 1, possibly by means of an eccentric which provides for raising of the saw blade at the end of the cutting stroke and re-application of the saw blade at the end of the idle stroke. On the other hand the cylinder-piston unit as illustrated in FIG. 1, as already described above, is pivotably articulated with its piston rod 3 to the machine frame 6.

For the sake of good order it should be mentioned that in FIG. 4 the cylinder-piston unit is installed in a position turned through 180° about its vertical axis in relation to the view of FIG. 1, so that in FIG. 4 the closure wall 11 and the setting means accessible in front of it, as for example the hand knob 23, are accessible from the left. Finally it should also be mentioned that the cylinder-piston unit lies, in FIG. 4, behind the guide plate 40 for the saw frame 42. In FIG. 4 there is also shown the shaft 49 of the crank wheel 48 and an eccentric 50 if any for a clockwise turning of shaft 49. The axis of bore 8 in FIG. 1 is the axis 48 in FIG. 4, if there is no eccentric, and is the axis of the eccentric 50 if there is any. The location of pivot axis 5 is in the machine frame 6 but in the under part which is not shown in FIG. 4.

It is to be understood that the above description of the present invention is susceptible to various modifications, changes and adaptations, and the same are intended to be comprehended within the meaning and range of equivalents of the appended claims.

What is claimed is:

1. In a double-acting cylinder piston unit for controlling the feed motion of a saw blade relative to a workpiece in a mechanical frame saw having a stationary machine frame, a housing part pivotally mounted on the machine frame and a saw frame guide movably mounted in the housing part and carrying a saw blade, the cylinder-piston unit being pivotally connected between the machine frame and housing part and including a cylinder, a piston displaceably mounted in the cylinder and dividing the interior of the cylinder into first and second cylinder chambers, a reservoir containing a hydraulic pressure medium, means defining a hydraulic medium flow path between the reservoir and each cylinder chamber such that hydraulic medium pressure in the first chamber produces a force urging the saw blade toward the workpiece, a respective non-return valve disposed between the reservoir and each flow path for permitting fluid flow from the reservoir into each cylinder chamber, a spring-loaded throttle valve including a valve member and a valve seat disposed in the flow path between the reservoir and the first cylinder chamber for permitting hydraulic medium to flow from the first cylinder chamber when the fluid pressure exceeds a predetermined value, and an adjustable throttle valve disposed in the flow path between the reservoir and the second cylinder chamber for permitting a controlled fluid flow therebetween, the improvement wherein: said piston is pivotally connected to the machine frame; said cylinder is pivotally connected to the pivotally mounted housing part; said cylinder comprises a cylinder head in the form of a block; said reservoir is delimited by one face of said block, a first wall extending from, and substantially perpendicular to, said one face and a second wall spaced from, and substantially parallel to, said face; said block is provided with two bores each defining a portion of said flow path between a respective cylinder chamber and said reservoir; each said bore communicates with its associated valve and forms the seat for said throttle valve communicating with its associated chamber; each said throttle valve member is mounted in said second wall in a manner to be adjustable relative to its associated seat; said means establishing a flow path between said reservoir and said first cylinder chamber comprise a tube extending within said cylinder, along the axis thereof from that bore in said block which forms a part of the same flow path; and said piston is provided with an axially extending bore communicating with said first cylinder chamber, into which said tube extends, and sealing means sealing said piston bore while permitting relative movement, in the axial direction of said cylinder, between said tube and said piston.

2. An arrangement as defined in claim 1 wherein the saw frame guide includes a saw drive having a crank shaft, and said block is provided with a bearing in which the crank shaft is mounted.

3. An arrangement as defined in claim 2 wherein the crank shaft includes an eccentric via which the crank shaft is mounted in said bearing, whereby rotation of the crank shaft raises the saw blade at the end of a cutting stroke and reapplication of the saw blade to a workpiece at the start of a cutting stroke.

* * * * *